(12) United States Patent
Shanmugam et al.

(10) Patent No.: US 11,907,110 B2
(45) Date of Patent: *Feb. 20, 2024

(54) METHODS AND SYSTEMS FOR AUTOMATED SOFTWARE TESTING (71) Applicant: Sauce Labs Inc., San Francisco, CA (US)

(72) Inventors: Ram Shanmugam, Fremont, CA (US); Rajagopal Rao, San Jose, CA (US); Krishna Srinivasan, San Jose, CA (US)

(73) Assignee: Sauce Labs Inc.

(*) Notice: Subject to any disclaimer, the term of this patent is extended or adjusted under 35 U.S.C. 154(b) by 0 days.

This patent is subject to a terminal disclaimer.

(21) Appl. No.: 18/170,131

(22) Filed: Feb. 16, 2023

(65) Prior Publication Data

US 2023/0244595 A1 Aug. 3, 2023

Related U.S. Application Data

(63) Continuation of application No. 16/529,746, filed on Aug. 1, 2019, now Pat. No. 11,604,722.

(60) Provisional application No. 62/712,980, filed on Aug. 1, 2018.

(51) Int. Cl.
G06F 11/36 (2006.01)
G06N 7/02 (2006.01)

(52) U.S. Cl.
CPC ...... *G06F 11/3684* (2013.01); *G06F 11/3688* (2013.01); *G06N 7/02* (2013.01)

(58) Field of Classification Search
CPC .. G06F 11/36; G06F 11/3684; G06F 11/3688; G06N 7/02
See application file for complete search history.

(56) References Cited

U.S. PATENT DOCUMENTS

| | | | |
|---|---|---|---|
| 7,899,694 B1 | 3/2011 | Marshall et al. | |
| 7,917,895 B2 | 3/2011 | Givoni et al. | |
| 8,346,563 B1 | 1/2013 | Hjelm et al. | |
| 8,892,419 B2 | 11/2014 | Lundberg et al. | |
| 9,038,026 B2 | 5/2015 | Chandra et al. | |
| 9,582,762 B1* | 2/2017 | Cosic | G11B 27/031 |
| 10,289,959 B2 | 5/2019 | Kakhandiki et al. | |
| 10,445,221 B2 | 10/2019 | Bromann et al. | |
| 10,838,849 B2 | 11/2020 | Kochura et al. | |
| 10,942,837 B2 | 3/2021 | Vidal et al. | |
| 11,087,889 B1 | 8/2021 | Frist, Jr. | |
| 11,106,570 B2 | 8/2021 | Maseedu et al. | |
| 11,221,942 B2* | 1/2022 | Sridhar | G06N 20/00 |
| 11,226,892 B2* | 1/2022 | Kochura | G06F 40/279 |
| 11,327,874 B1 | 5/2022 | Klein et al. | |

(Continued)

OTHER PUBLICATIONS

U.S. Non-Final Office Action dated May 31, 2022, in U.S. Appl. No. 16/529,746.

(Continued)

*Primary Examiner* — Kamini B Patel
(74) *Attorney, Agent, or Firm* — Weaver Austin Villeneuve & Sampson LLP (57) ABSTRACT

In one aspect, a computerized method useful for automated software testing comprising: writing a test suite in a human-readable language; implementing an Artificial Intelligent (AI) process test suite; and creating a set of scripts, data, and execute tests.

24 Claims, 6 Drawing Sheets

(56) References Cited

U.S. PATENT DOCUMENTS

| | | |
|---|---|---|
| 2004/0010735 A1 | 1/2004 | Paternostro et al. |
| 2004/0107415 A1 | 6/2004 | Melamed et al. |
| 2007/0022407 A1 | 1/2007 | Givoni et al. |
| 2008/0222608 A1 | 9/2008 | Gartner et al. |
| 2009/0307665 A1 | 12/2009 | Sharma et al. |
| 2010/0257211 A1 | 10/2010 | Glowacki et al. |
| 2011/0202901 A1 | 8/2011 | Givoni et al. |
| 2011/0276944 A1 | 11/2011 | Bergman et al. |
| 2013/0074043 A1* | 3/2013 | Fu .................. G06F 11/3664 717/125 |
| 2013/0263089 A1 | 10/2013 | Banerjee et al. |
| 2017/0262360 A1 | 9/2017 | Kochura et al. |
| 2019/0179732 A1* | 6/2019 | Venkatasubramanian ............... G06F 40/20 |
| 2019/0354848 A1* | 11/2019 | Kotri ..................... G06F 8/38 |
| 2020/0341888 A1* | 10/2020 | Sridhar ............. G06F 11/3692 |
| 2021/0049092 A1* | 2/2021 | Kochura ........... G06F 11/3688 |
| 2022/0043968 A1 | 2/2022 | Lavery et al. |
| 2022/0058114 A1 | 2/2022 | Ranjan Jena et al. |
| 2022/0100643 A1 | 3/2022 | Storck |
| 2022/0100646 A1 | 3/2022 | Huang et al. |

OTHER PUBLICATIONS

U.S. Notice of Allowance dated Nov. 9, 2022 in U.S. Appl. No. 16/529,746.

* cited by examiner

METHODS AND SYSTEMS FOR AUTOMATED SOFTWARE TESTING

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

1. Field

This application relates generally to automated software testing.

2. Related Art

Improvements to automated software testing are desired.

BRIEF SUMMARY OF THE INVENTION

In one aspect, a computerized method useful for automated software testing comprising: writing a test suite in a human-readable language; implementing an Artificial Intelligent (AI) process test suite; and creating a set of scripts, data, and execute tests.

BRIEF DESCRIPTION OF THE DRAWINGS

The Figures described above are a representative set and are not an exhaustive with respect to embodying the invention.

DESCRIPTION

Disclosed are a system, method, and article of manufacture of automated software testing. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions and Example Algorithms

Apache Shiro is a .Java security framework that performs authentication, authorization, cryptography, and session management.

Fuzzy logic is a form of many-valued logic in which the truth values of variables may be any real number between 0 and 1. It is employed to handle the concept of partial truth, where the truth value may range between completely true and completely false.

MySQL is an open-source relational database management system (RDBMS).

Natural language processing is the field of computer science concerned with human speech as it is spoken.

SELENIUM is a portable software-testing framework for web applications. SELENIUM can provide a playback tool for authoring tests without the need to learn a test scripting language. It also provides a test domain-specific language to write tests in a number of popular programming languages, including, for example, C#, GROOVY, JAVA, PERL, PHP, PYTHON, RUBY and SCALA. The tests can then run against most modern web browsers. SELENIUM deploys on WINDOWS, LINUX, and MACOS platforms.

Software testing can include the investigation conducted to provide stakeholders with information about the quality of the software product or service under test.

Stanford CoreNLP provides a set of human language technology tools. It can give the base forms of words, their parts of speech, whether they are names of companies, people, etc., normalize dates, times, and numeric quantities, mark up the structure of sentences in terms of phrases and syntactic dependencies, indicate which noun phrases refer to the same entities, indicate sentiment, extract particular or open-class relations between entity mentions, get the quotes people said, etc.

Example Systems and Methods

Figure 1:
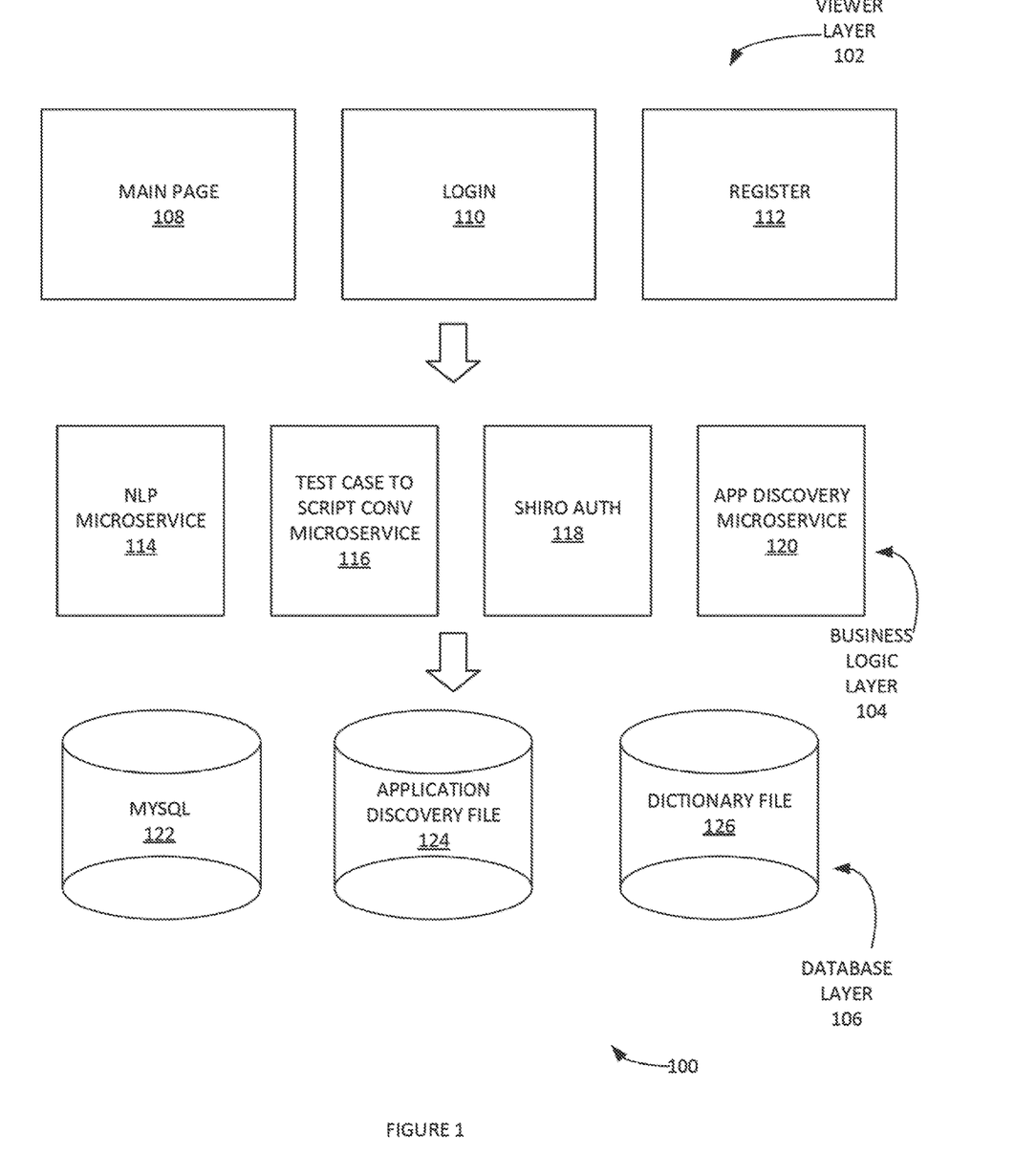
FIG. 1 illustrates an automated software testing system, according to some embodiments.

FIG. 1 illustrates an automated software testing system 100, according to some embodiments. Automated software testing system 100 can be used for test script generation and other tools. Automated software testing system 100 can include a viewer layer 102. Viewer layer 102 can include a main page 108, user login 110, registration interfaces 112, etc. Automated software testing system 100 can include a business logic layer 104. Business logic layer 104 can include NLP microservice 114, test case script to conversion microservice 116, Shiro Authentication module 118 (e.g. APACHE SHIRO AUTHENTICATION services, etc.), application discovery microservice, 120, etc. NLP microservice 114 can break down sentences into elements and identify the elements. This information can be placed into an intermediate file of object-action pairs. The test case script to conversion microservice 116 reads the intermediate file of object-action pair entries. For each object-action pair entry in the file, test case script to conversion microservice 116 generates a SELENIUM command. For example, the test case script to conversion microservice 116 can create a Java file that includes SELENIUM script for each object-action pair.

Automated software testing system 100 can include a database layer 106. Database layer 106 can include MySQL services 122, application discovery file(s) 124, dictionary file(s) 126, etc. Dictionary file(s) 126 can include a dictionary that maintains a list of words and their synonyms. These can be used to implement fuzzy logic identifications such as when a noun is checked against its object repository file (e.g. an application discovery file, etc.) to identify element or associated field. It is noted that .JSON can be used for application discovery and dictionary files.

Figure 2:
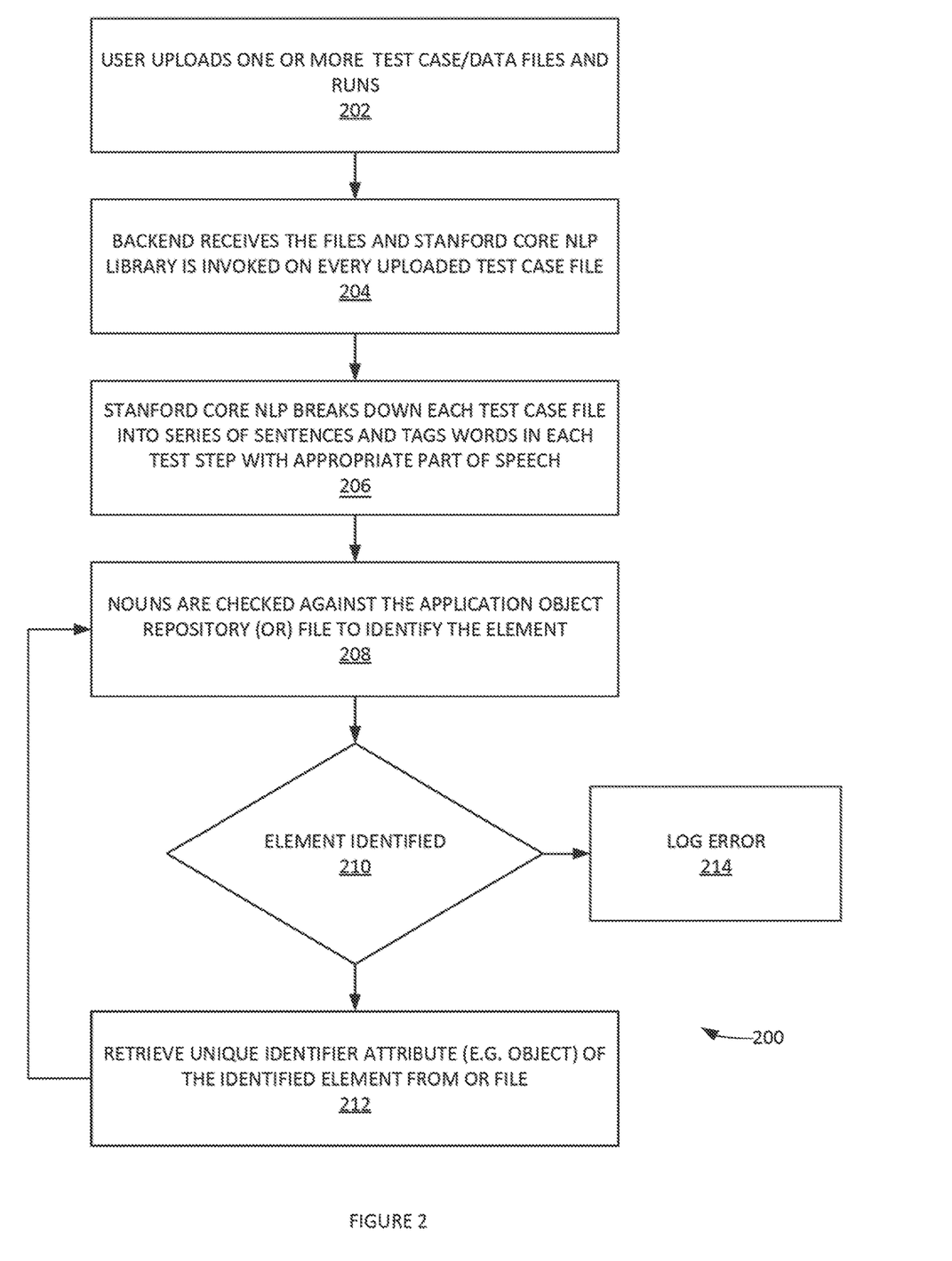
FIG. 2 illustrates an example process for automated software testing, according to some embodiments.

FIG. 2 illustrates an example process 200 for automated software testing, according to some embodiments. In step 202, a user can upload one or more test case/data files and runs. In step 204, a backend can receive a set of files and/or a Stanford core NLP library is invoked on every uploaded test case file.

In step 206, Stanford core NLP can break down each test case file into series of sentences (e.g. individual test steps) and tags words in each test step with appropriate part of speech. In step 208, nouns can be checked against the application object repository (OR) file to identify the element. The OR file can include information about every HTML element (label-field pair) on each page of the application. Fuzzy logic can be used to check nouns against the OR file to identify elements. Accordingly, the appropriate element can be identified even though the noun doesn't exactly match the element label. Synonyms of verbs are checked against dictionary to determine the action on the element. The element label is also checked against the test data file to ensure the data exists. In step 210, it can be determined if the element identified? If 'no', then process 200 can log an error in step 214. For example, an error report can be generated. The error report can include which element was not identified and the reason for the lack of identification.

If 'yes', then, in step 212, process 200 can retrieve unique identifier attribute (e.g. an object) of the identified element from OR file. The retrieval of the unique action can be taken on the element from the dictionary file. Process 200 can create an object-action entry into an intermediate file available for test script conversion microservice 116. This intermediate file can contain an object-action entry for each test step in each test case file.

Figure 3:
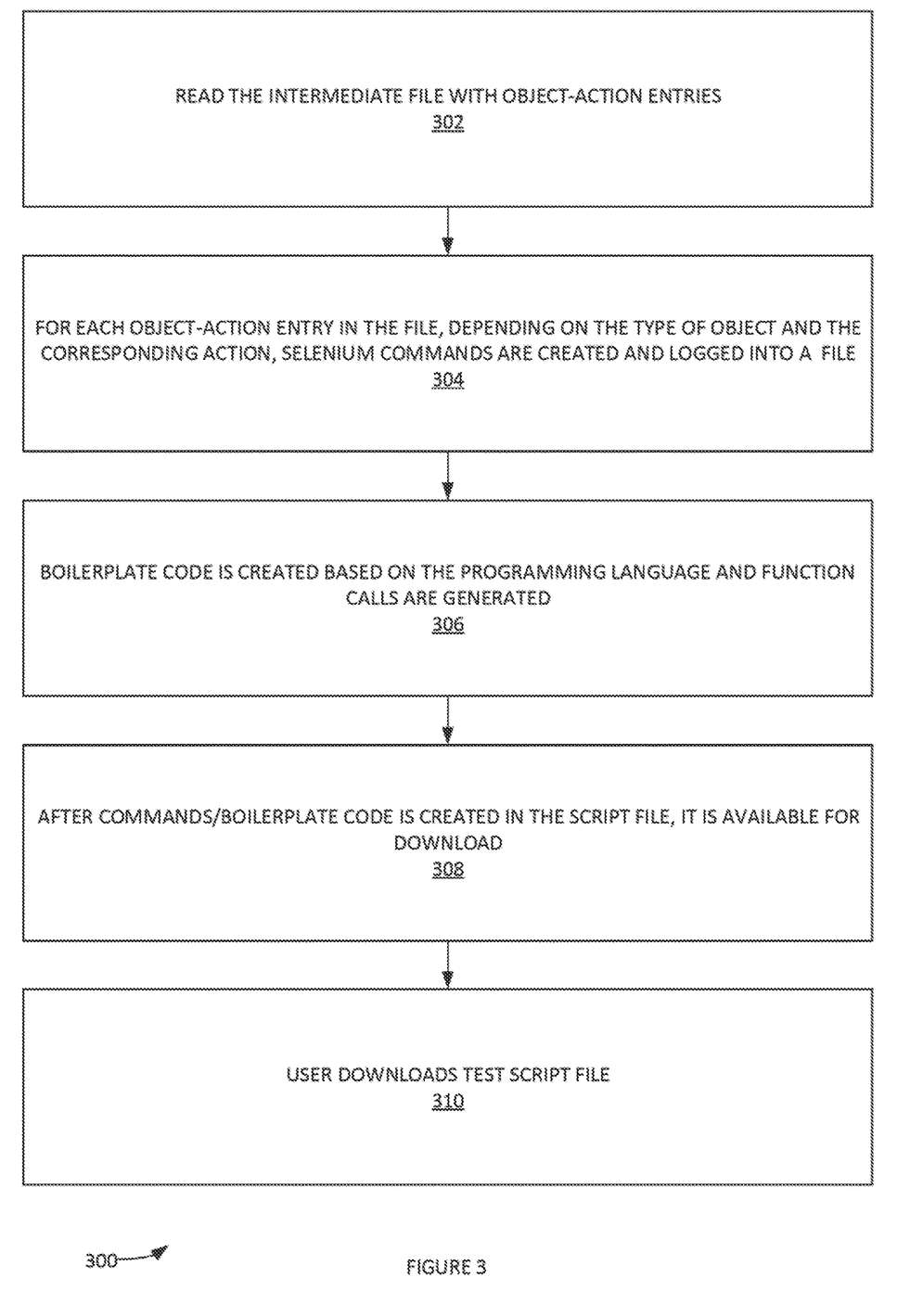
FIG. 3 illustrates another example process for automated software testing, according to some embodiments.

FIG. 3 illustrates another example process 300 for automated software testing, according to some embodiments. In step 302, a test-script conversion microservice reads the intermediate file with object-action entries.

In step 304, for each object-action entry in the file, and depending on the type of object and the corresponding action, SELENIUM commands are created and logged into a script.java file. For example, a click action on a button with unique identifier as "saveForm" can have a different SELENIUM command than an enter action on a text box with unique identifier as "enterFirstName". These SELENIUM commands can be generated in, for example, .Java, C#, Python, PHP and RUBY programming languages. Page Object Model (POM} design pattern is used for maintainability. The POM can include the objects for each page that are saved in a separate file. Test case calls object for a corresponding file. In this way, can be used by a plurality of test cases even if object name changes.

In step 306, boilerplate code can be created based on the programming language (e.g. functions to take a screenshot, read from a file, gracefully exit the browser after test script execution is completed, function to encapsulate generated selenium commands, etc.). These function calls can be made whenever needed during process 300. Special code exceptions can be made on an as-needed basis. For example, indentation styling can change if the block of code is within a for loop.

In step 308, after the commands/boilerplate code are created in the script file, it is available for download. In step 310, a user can download the test script file.

Figure 4:
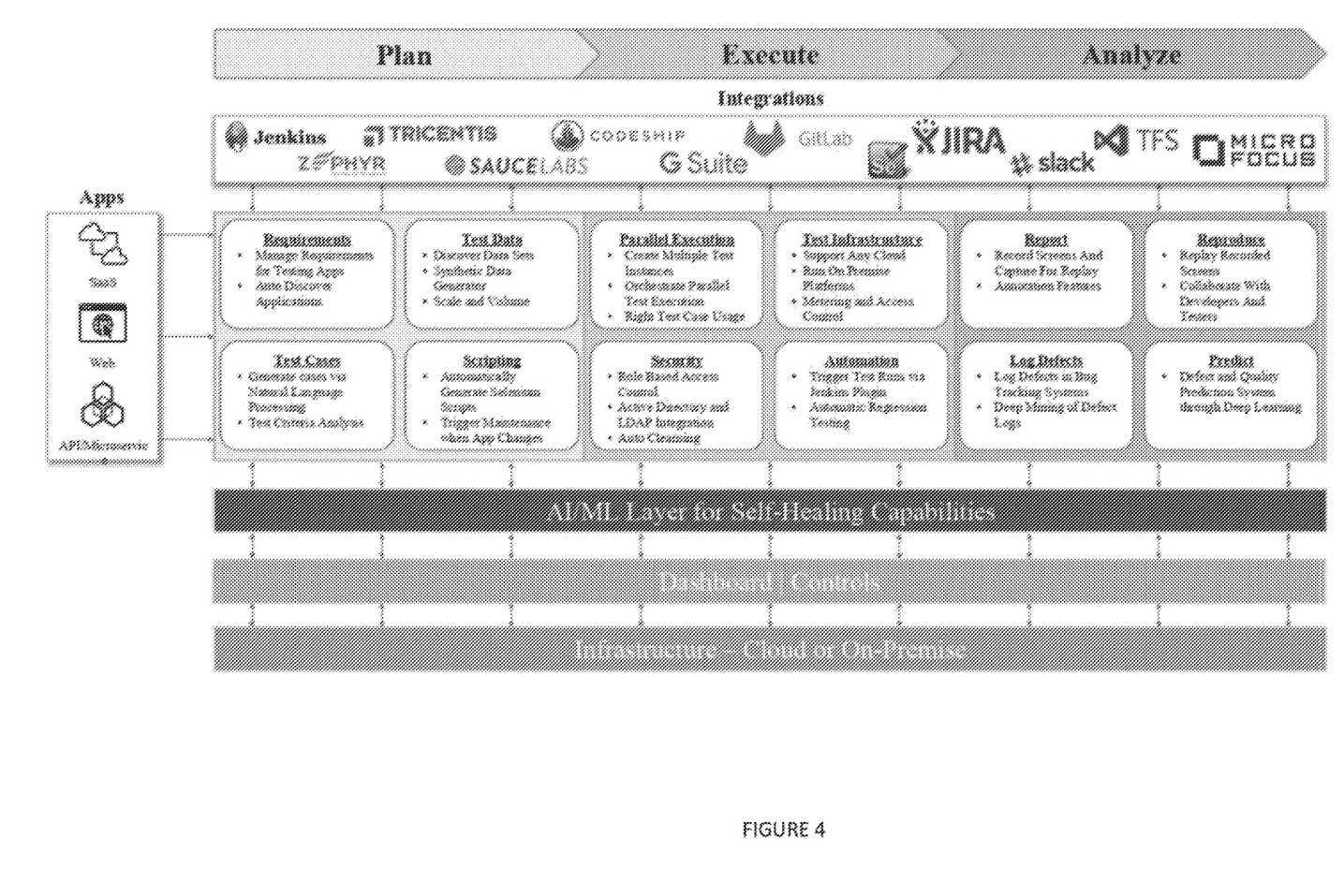
FIG. 4 illustrates yet another example process for automated software testing, according to some embodiments.

FIG. 4 illustrates yet another example process for automated software testing, according to some embodiments.

Figure 5:
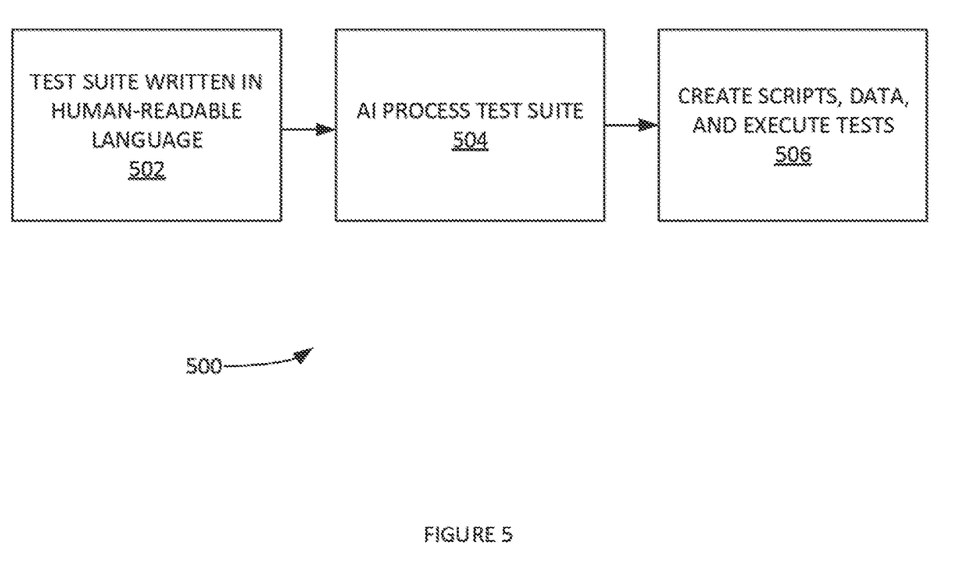
FIG. 5 illustrates an example process for automated software testing, according to some embodiments.

FIG. 5 illustrates an example process 500 for automated software testing, according to some embodiments. In step 502, a test suite can be written in human-readable language (e.g. English, etc.). In step 504, an Artificial Intelligent (AI) process test suite is implemented. The AI process test suite can implement the process provided herein (e.g. processes 200 and 300, etc.). In step 506, process 600 can create scripts, data, and execute tests.

Figure 6:
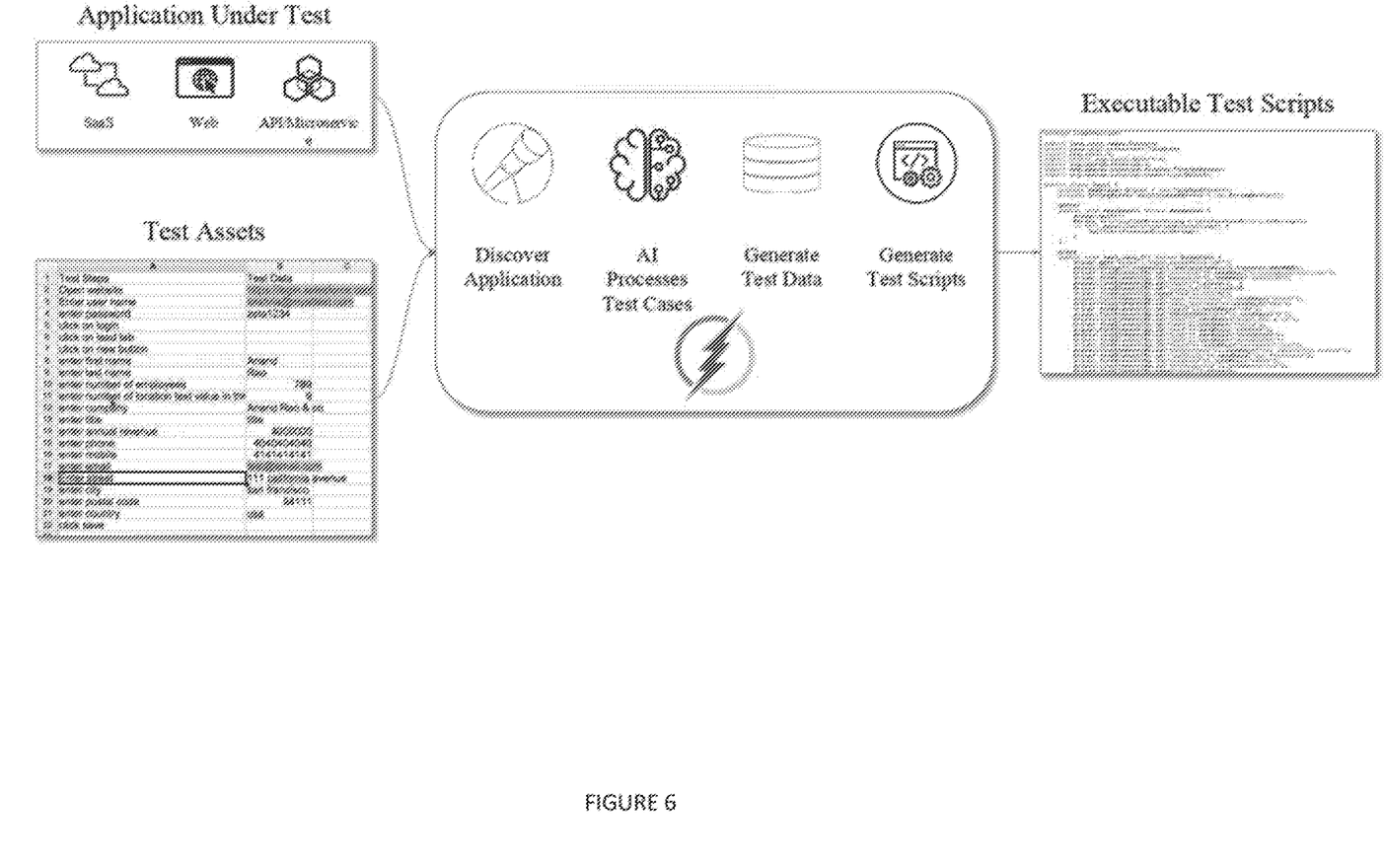
FIG. 6 illustrates an example schematic system useful for implementing an automated software testing, according to some embodiments.

FIG. 6 illustrates an example schematic useful for implementing an automated software testing, according to some embodiments.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g. a computer system) and can be performed in any order (e.g. including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method comprising:
    obtaining one or more sentences from test data;
    tagging one or more words in the one or more sentences with an associated part of speech;
    checking a noun of the one or more words against an object repository (OR) file to identify an element; and
    retrieving a unique identifier attribute of the element from the OR file.

2. The method of claim 1, wherein one or more of the obtaining operation or the tagging operation is performed using a Natural Language Processing (NLP) library associated with the test data.

3. The method of claim 1, wherein the OR file includes information about an HTML element on a page of an application.

4. The method of claim 1, wherein the noun does not match a label of the element.

5. The method of claim 1, further comprising:
    checking a label of the element against the test data to confirm data existence.

6. The method of claim 1, further comprising:
    generating an object-action entry in a file available for test script conversion.

7. The method of claim 1, further comprising:
    generating a set of one or more scripts, data, and one or more tests to be executed.

8. The method of claim 1, further comprising:
    checking a verb associated with the one or more words against a dictionary to determine an action on the element.

9. A system comprising:
    a machine-readable medium; and
    a data processing system configured to cause:
        obtaining one or more sentences from test data,
        tagging one or more words in the one or more sentences with an associated part of speech,
        checking a noun of the one or more words against an object repository (OR) file to identify an element, and
        retrieving a unique identifier attribute of the element from the OR file.

10. The system of claim 9, wherein one or more of the obtaining operation or the tagging operation is performed using a Natural Language Processing (NLP) library associated with the test data.

11. The system of claim 9, wherein the OR file includes information about an HTML element on a page of an application.

12. The system of claim 9, wherein the noun does not match a label of the element.

13. The system of claim 9, the data processing system further configured to cause:
    checking a label of the element against the test data to confirm data existence.

14. The system of claim 9, the data processing system further configured to cause:
    generating an object-action entry in a file available for test script conversion.

15. The system of claim 9, the data processing system further configured to cause:
    generating a set of one or more scripts, data, and one or more tests to be executed.

16. The system of claim 9, the data processing system further configured to cause:
    checking a verb associated with the one or more words against a dictionary to determine an action on the element.

17. A non-transitory machine-readable medium storing program code executable to cause:
    obtaining one or more sentences from test data;
    tagging one or more words in the one or more sentences with an associated part of speech;
    checking a noun of the one or more words against an object repository (OR) file to identify an element; and
    retrieving a unique identifier attribute of the element from the OR file.

18. The non-transitory machine-readable medium of claim 17, wherein one or more of the obtaining operation or the tagging operation is performed using a Natural Language Processing (NLP) library associated with the test data.

19. The non-transitory machine-readable medium of claim 17, wherein the OR file includes information about an HTML element on a page of an application.

20. The non-transitory machine-readable medium of claim 17, wherein the noun does not match a label of the element.

21. The non-transitory machine-readable medium of claim 17, the program code further executable to cause:
    checking a label of the element against the test data to confirm data existence.

22. The non-transitory machine-readable medium of claim 17, the program code further executable to cause:
    generating an object-action entry in a file available for test script conversion.

23. The non-transitory machine-readable medium of claim 17, the program code further executable to cause:
    generating a set of one or more scripts, data, and one or more tests to be executed.

24. The non-transitory machine-readable medium of claim 17, the program code further executable to cause:
    checking a verb associated with the one or more words against a dictionary to determine an action on the element.

* * * * *